United States Patent [19]

McAinsh

[11] 4,060,094
[45] Nov. 29, 1977

[54] ELECTRICAL-INTERCONNECTION ASSEMBLIES AND METHODS OF FORMING INTERCONNECTIONS THEREIN

[75] Inventor: Kenneth G. McAinsh, Frimley, England

[73] Assignee: Smiths Industries Limited, London, England

[21] Appl. No.: 635,490

[22] Filed: Nov. 26, 1975

[51] Int. Cl.² ............................................. H01V 1/02
[52] U.S. Cl. .............................. 136/230; 339/276 A; 174/75 R; 29/628
[58] Field of Search .................. 339/276 A; 174/84 R, 174/94 R, 74 R, 75 R; 136/212, 227, 230, 231, 235; 29/628; 156/50

[56] References Cited

U.S. PATENT DOCUMENTS

| 3,048,642 | 8/1962 | Parker | 136/235 |
| 3,210,714 | 10/1965 | Hummel | 29/628 |
| 3,246,520 | 4/1966 | Gaskill et al. | 136/235 |
| 3,271,717 | 9/1966 | Gilbert | 29/628 |
| 3,427,208 | 2/1969 | Lowdermilk | 136/235 |
| 3,806,630 | 4/1974 | Thompson et al. | 29/628 |
| 3,871,932 | 3/1975 | Langenberg | 29/628 |

Primary Examiner—Nelson Moskowitz
Attorney, Agent, or Firm—Pollock, Vande Sande and Priddy

[57] ABSTRACT

Two thermocouple junctions of a gas-turbine thermocouple probe are provided by junctions between respective pairs of wires that form the inner conductors of a metal-sheathed mineral-insulated cable. External electrical connections to the pairs of wires are established at a ceramic support block into which the cable extends, the connection in each case being made by a thicker wire that extends completely through the block from the opposite direction of the cable, and then turns back on itself to extend through the block again and emerge adjacent the end of the cable. The thin inner conductors of the cable are twisted about the projecting ends of their respective connecting wires and welded to them to complete the connections.

11 Claims, 4 Drawing Figures

4,060,094

ELECTRICAL-INTERCONNECTION ASSEMBLIES AND METHODS OF FORMING INTERCONNECTIONS THEREIN

This invention relates to electrical interconnection assemblies, and to methods of forming interconnections therein.

The invention is particularly, though not exclusively, applicable to the establishment of interconnections between the thin conductors of a thermocouple and the thicker conductors necessary for connecting the thermocouple to an external temperature-measuring circuit.

Difficulty has been experienced in the past in establishing electrical interconnection between electrical conductors of significantly differing diameter, especially where very thin conductors are involved and it is necessary for the interconnection to withstand stresses caused by vibration and temperature changes, such as, for example, those experienced within a gas-turbine engine.

It is an object of the present invention to provide an interconnection assembly including an electrical interconnection and a mechanical support for the conductors so that the electrical connection is as far as possible not required to support the weight of the conductors nor to withstand shock forces transmitted through them.

According to one aspect of the present invention there is provided an arrangement including an electrical interconnection between two electrical conductors, in which the conductors extend from opposite directions into, and are retained by, a support member, wherein one of the conductors turns back on itself through the support member to emerge from the same direction as the other conductor and the interconnection is established by connection together of said other conductor and the emergent portion of said one conductor.

With such an arrangement, both conductors may be readily secured firmly within the support member, so that the electrical connection between the conductors can be to a large degree isolated from any movement of those conductors occuring away from the support member. The likelihood of degradation, or ultimately, fracture, of the electrical interconnection can accordingly be reduced using the arrangement of the invention.

The two conductors may be of the same diameter as one another, but the invention is of especial advantage when the diameters differ significantly from one another. In the latter case, the rigid mechanical support provided by the support member for the thicker conductor reduces to a significant extent flexing that may be transmitted through this conductor to the electrical connection from outside. Such flexing, which may arise from vibration, could be detrimental to the interconnection and cause fracture of the thinner conductor.

According to a further aspect of the present invention there is provided a method of forming an electrical interconnection between two electrical conductors, wherein a first conductor is passed from one direction through a support member and is retained therein with one end emergent therefrom, and electrical connection is established between this end and an end of a second conductor that is carried by the support member, the said second conductor extending through the support member from the opposite direction to said one direction and then turning back on itself through the support member to its said end.

With such a method the formed electrical interconnection tends to be isolated from the remainder of the two conductors so that connections may be made to them elsewhere with reduced risk of damage to the said electrical interconnection.

A thermocouple probe, which is for use in an aircraft gas-turbine engine and which includes an electrical interconnection, and a method of forming such interconnection, all in accordance with the present invention, will now be described, by way of example, with reference to the accompanying drawings, in which.

Figure 1:
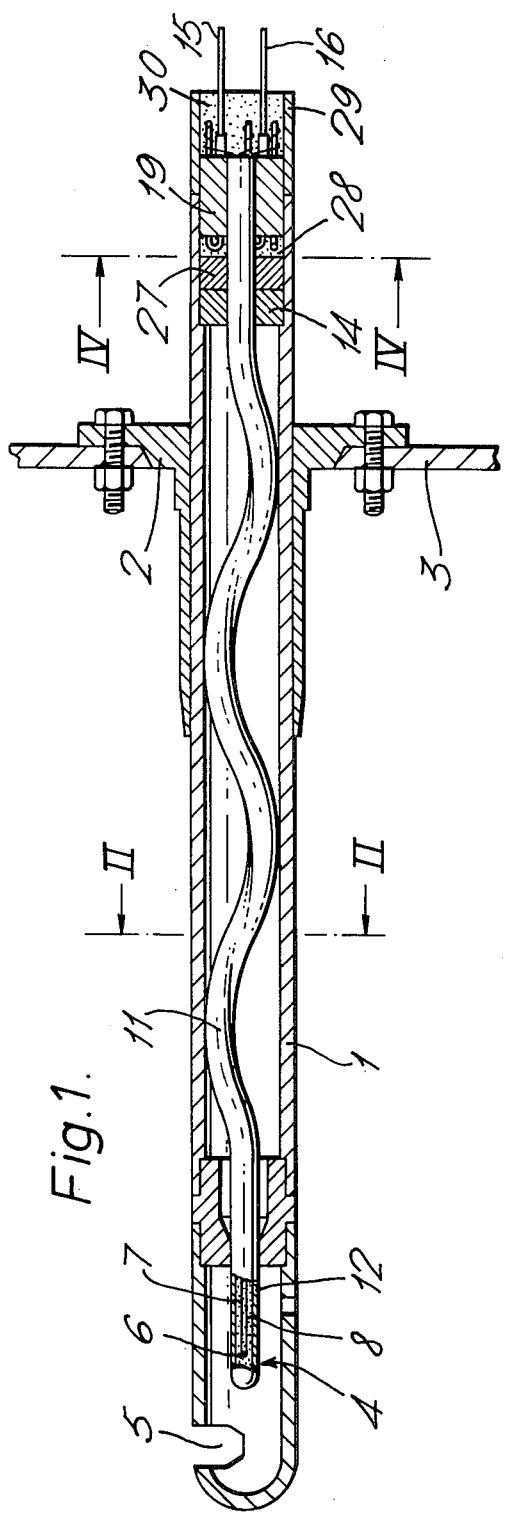
FIG. 1 is a sectional side elevation of the thermocouple probe.
Figure 2:
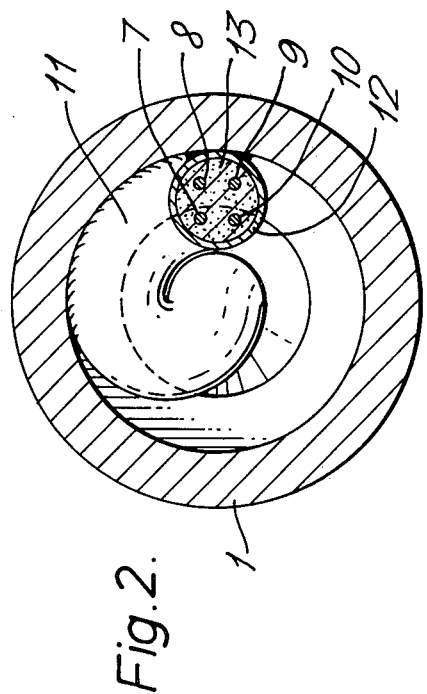
FIG. 2 is a section on the line II—II of FIG. 1, to an enlarged scale.

Referring to FIGS. 1 and 2, the thermocouple probe has an outer tubular shell 1 and a flange 2 by which it is bolted to a wall 3 of the jet-pipe of a gas-turbine aircraft engine. The shell 1 projects through the wall 3 and at its far end encloses a thermocouple 4 which receives hot combustion gases via an aperture 5 that faces upstream of the gas flow in the jet-pipe.

The thermocouple 4 is formed by two metal-encased junctions 6, one of which is provided by the welding together of wires 7 and 8, and the other (not shown) by the welding together of wires 9 and 10. The wires 7 and 9, which are of a nickel-chrome alloy, and the wires 8 and 10, which are of a nickel-aluminum alloy, are the inner conductors of a mineral-insulated cable 11 that extends within the shell 1 along the length of the probe from the thermocouple 4 for establishing external electrical connection with the junctions 6. The inner conductors 7 to 10 of the cable 11 are insulated from one another and from the metal cable-sheath 12 by compacted magnesium oxide powder 13.

The cable 11 extends along the probe in a helical path against the inner surface of the shell 1, with its metal sheath 12 brazed along substantially the whole of its length to this surface. At the near-end of the probe, outside the jet-pipe, the cable 11 is retained through a metal washer 14 for connection via a set of leads or further conductors 15 to 18 (of which only conductors 15 and 16 are shown in FIG. 1) to an external measuring circuit (not shown). The cable 11 and the conductors 15 to 18 extend from opposite directions into, and are retained by a ceramic cylindrical block 19 retained within the near-end of the probe, such that mechanical forces on the electrical connections between the conductors 7 to 10 and 15 to 18 are minimized.

Figure 3:
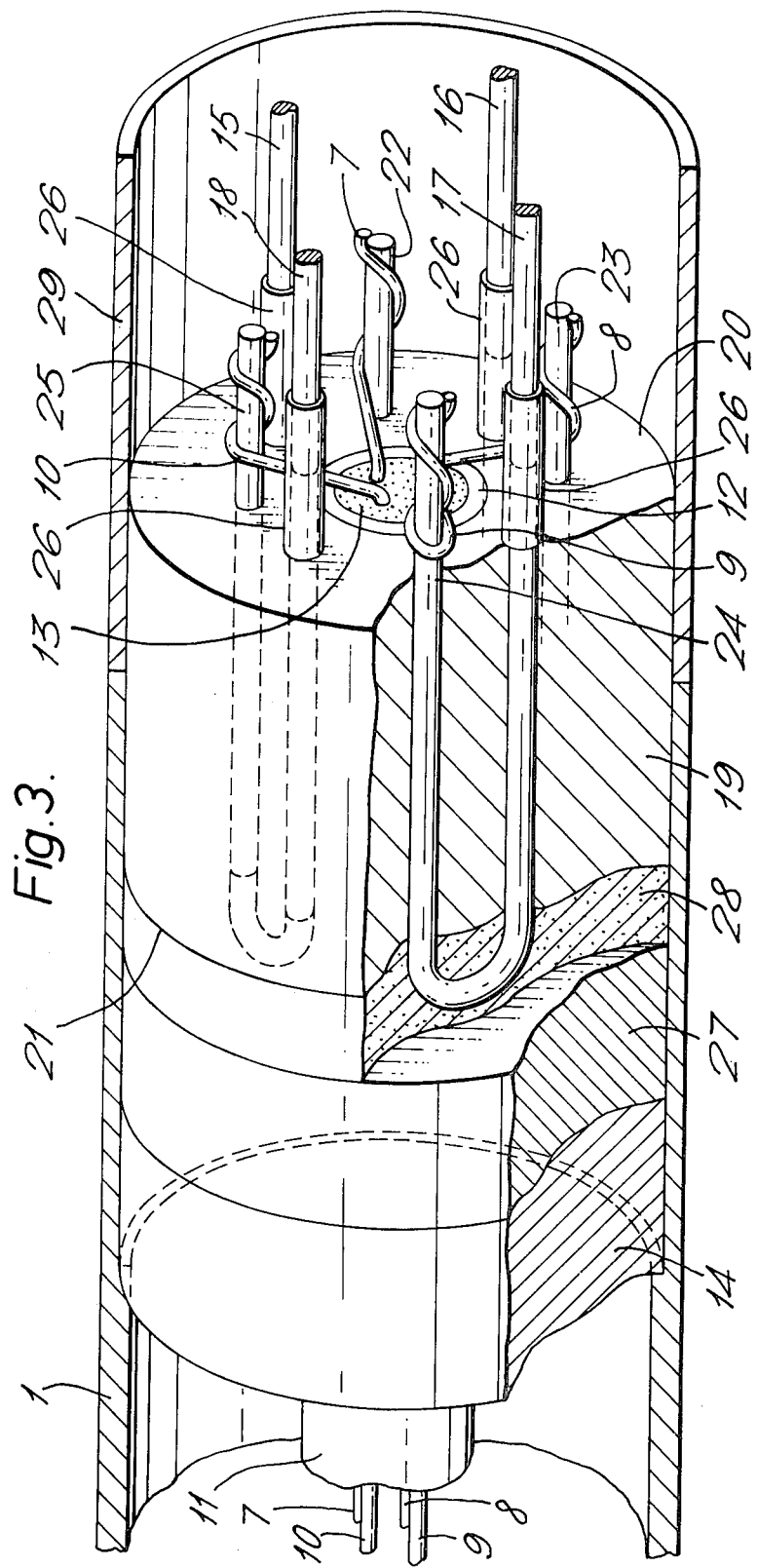
FIG. 3 is an enlarged perspective view of one end of the probe of FIG. 1, before final encapsulation of the probe.
Figure 4:
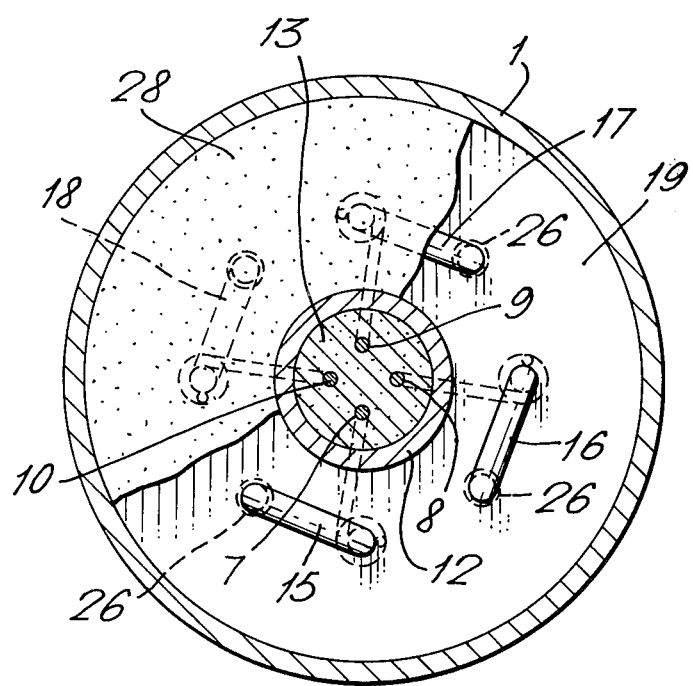
FIG. 4 is an enlarged sectional view of the probe taken on the line IV—IV of FIG. 1.

Referring to FIGS. 3 and 4, the conductors 15 to 18 enter the outer face 20 of the block 19 through individual ones of four equi-spaced holes, and where they emerge from the inner face 21 of the block 19 within the shell 1, are bent back on themselves to pass again through the block 19 via four adjacent holes. The conductors 15 to 18 emerge from the outer face 20 of the block 19 to leave short emergent end portions 22 to 25 projections from that face. The cable 11, on the other hand, extends axially through the block 19 from within the shell 1, its outer sheath 12 and the insulating material 13 terminating flush with the face 20. The conductors 7 to 10 extend from the sheath 12 and are twisted around respective ones of the projecting ends 22 to 25 of the conductors 15 to 18. The conductors 7 to 10 are spot-welded in place so as to ensure that the good electrical connections established individually with the conductors 15 to 18 are maintained. Insulating sleeves 26 are fitted on the conductors 15 to 18 where they enter the face 20 to ensure that connection with the conductors 7 to 10 is confined to the re-emergent ends 22 to 25.

The conductors 15 to 18 and the cable 11 fit tightly into the block 19 so that the welded interconnections are not loaded by the weights of the conductors and cable. This is particularly important in this application of the invention, since the conductors 15 to 18 are 0.040 inch in diameter and the conductors 7 to 10 of the cable 11 are 0.011 inch in diameter. Unless there is good mechanical support for interconnections of wires of such different diameters there is a high probability that the finer wires will break in due course.

During manufacture of the probe, the cable 11 is first secured within the shell 1 and through the washer 14, by brazing. An electrically-insulating washer 27 is fitted over the cable 11 against the washer 14 within the shell 1 to insulate the conductors 15 to 18 from the washer 14 when the block 19 is fitted.

The conductors 15 to 18 bent into "U"-shapes are threaded through the block 19 from the face 21. The open end of the shell 1 around the cable 11 is then filled with a thermosetting adhesive 28, and the block 19 pushed into the shell 1 with the face 21 leading, over the cable 11 and onto the washer 27. Excess adhesive is removed, and the probe heated to cure the adhesive and to secure the block 19 to the shell 1.

The inner conductors 7 to 10 of the cable 11 are now twisted and welded to the respective ends 22 and 25 of the conductors 15 to 18. The insulating sleeves 26 are also now fitted onto the conductors 15 to 18.

A further sleeve 29 is pushed tightly over the block 19 and into abutment with the end of the shell 1, to shroud the conductor ends 22 to 25. The space within the sleeve 29 is filled with thermosetting adhesive 30 (see FIG. 1), which seeps into any gaps that may still exist around the conductors 15 to 18 and the cable 11 and in the block 19. This adhesive is then cured so as to secure the fragile thermocouple-conductors 7 to 10 firmly with the block 19. Additionally the comparatively-robust conductors 15 to 18 are in this way further secured to the block 19 to inhibit transfer to their electrical interconnection with the conductors 7 to 10, of externally applied forces.

In the embodiment described, the block 19 is wholly of electrically-insulative material, but it may alternatively be of an electrically-conductive material, if conductors 15 to 18 are electrically insulated where they pass through it.

I claim:

1. An electrical-interconnection assembly comprising two electrical conductors, a support member fabricated of electrically-insulative material, said support member having an end face and being operative to support said two conductors, a first of the two conductors extending from a first direction into and through the support member to emerge from said end face, and the second conductor extending into said support member from a second direction opposite to said first direction, said second conductor having an end portion thereof that turns back on itself through the support member to emerge from said end face of the support member from said first direction, and means electrically interconnecting the said end portion of said second conductor to the emergent portion of said first conductor at a position exterior of said electrically-insulative support member where said first conductor emerges from said end face.

2. An assembly according to claim 1, including an electrical cable, said cable having an outer protective sheath and at least one inner conductor extending within said sheath, means retaining the sheath to said support member, said cable projecting into said support member from said first direction, and said first conductor being said inner conductor of said cable.

3. An assembly according to claim 1 wherein said second electrical conductor extends from said second direction through said support member to emerge therefrom and wherein said second electrical conductor then turns back on itself to project into and through said support member from said first direction.

4. An electrical-interconnection assembly comprising a support member which has first and second ends, a plurality of electrical conductors, each said electrical conductor entering the first end of the support member to emerge therefrom at said second end of the support member, an electrical cable that enters the second end of the support member to extend for a substantial distance into said support member, and means retaining the said conductors and cable to the support member, each said conductor having an end portion thereof that extends back into the support member at said second end of the support member to emerge from said first end of the support member, and said cable having a plurality of mutually insulated inner conductors, each said inner conductor respectively connecting electrically with an individual one of said emergent end portions at said first end of the support member.

5. Thermocouple apparatus comprising an electrical cable, said cable having an outer protective sheath and a first pair of mutually-insulated electrical conductors within said sheath, a thermocouple junction formed between the conductors of said first pair, a second pair of mutually-insulated electrical conductors, each conductor of said second pair having a substantially larger cross-sectional area than each conductor of said first pair, a support member for supporting said cable and said second pair of conductors, means for retaining said cable sheath and said second pair of conductors in said support member, said support member having an end face, said cable extending into said support member from a first direction to emerge at said end face, said second pair of conductors extending through said support member from a second direction opposite to said first direction, the conductors of said second pair of conductors each having an end portion thereof that turns back on itself through the support member to emerge from said end face of the support member from said first direction, the said end portion of each conductor of said second pair of conductors being electrically interconnected with an individual one of the conductors of said first pair at a position adjacent said end face.

6. A method of forming an electrical interconnection between a first electrical conductor and a second electrical conductor, including the steps of passing said first conductor from a first direction through a support member of electrically-insulative material, to be retained therein, and establishing electrical connection between said first conductor and one end of said second conductor that extends from a second direction opposite to said first direction through said support member and turns back on itself through said support member such that said one end emerges from said first direction.

7. An electrical-interconnection assembly comprising a plurality of pairs of electrical conductors, a support member which has an end face and which supports the two conductors of each pair, a first of the two conductors of each pair extending from a first direction into and through the support member to emerge from said end face, and the second conductor of each pair extending into said support member from a second direction opposite to said first direction, each said second conductor having an end portion thereof that turns back on itself through the support member to emerge from said end face from said first direction, means electrically insulating the said pairs of conductors from one another within said support member, and means electrically interconnecting the said end portion of said second conductor of each pair with said first conductor of the respective pair where this said first conductor emerges from said end face.

8. An assembly according to claim 7, including an electrical cable having an outer protective sheath and wherein the said first conductors of the said pairs of conductors are individual inner conductors of the cable within said sheath, means within said sheath for insulating the inner conductors electrically from one another, and said assembly further including means retaining the sheath in fixed position relative to said support member with said sheath projecting into said support member from said first direction.

9. An assembly according to claim 7 wherein each said second electrical conductor extends from said second direction through said support member to emerge therefrom, and then turns back on itself to project into and through said support member from said first direction.

10. An electrical-interconnection assembly comprising an electrical cable, said cable having an outer metal sheath and at least one inner conductor extending within and insulated from said sheath, a second electrical conductor, said inner conductor having a substantially smaller cross-sectional area than said second conductor, a support member which has an end face and which supports said cable and said second conductor said cable projecting into said support member from a first direction with said inner conductor extending through said support member to emerge from said end face of said support member, and the second conductor extending into said support member from a second direction opposite to said first direction and having an end portion thereof that turns back on itself through the support member to emerge from said end face of the support member from said first direction, means electrically insulating the second conductor from said sheath, and means electrically interconnecting the said end portion of said second conductor with said inner conductor adjacent the positions where said inner and second conductors emerge from said end face of the support member.

11. An electrical-interconnection assembly comprising a support member of electrically insulative material, said support member having first and second ends, an electrical conductor that enters the first end of the support member to emerge therefrom at said second end, an electrical cable having an outer sheath that enters the second end of the support member to extend for a substantial distance into said support member to be supported thereby, and means retaining the said conductor and sheath to the support member, said conductor having an end portion thereof that extends back into the support member at said second end to emerge from said first end, said cable having an inner metal strand substantially thinner than said conductor, and electrically-insulative material supporting said inner strand within said sheath, said strand extending from said sheath out of the support member to connect electrically with said emergent end portion of said conductor at a position adjacent said first end of said support member.

* * * * *